Aug. 2, 1966   R. B. WALLACE   3,263,639
STEERING SYSTEM FOR A BOAT
Filed Aug. 24, 1964
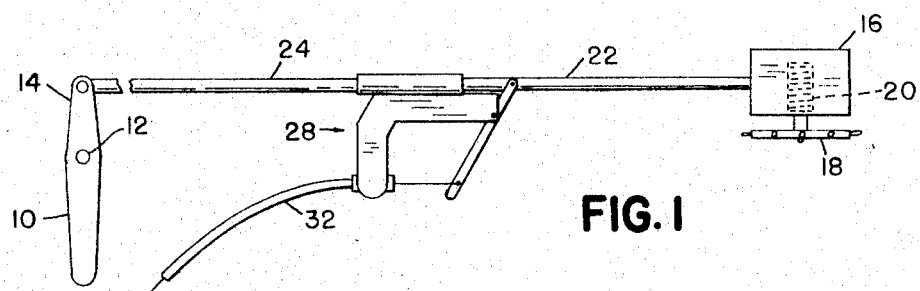
FIG. 1
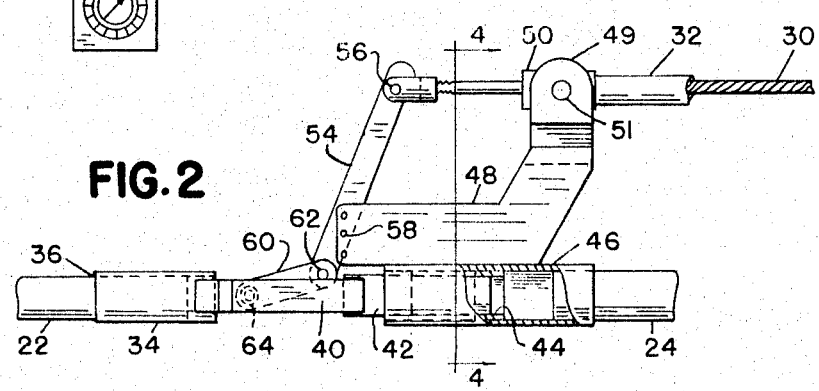
FIG. 2
FIG. 3
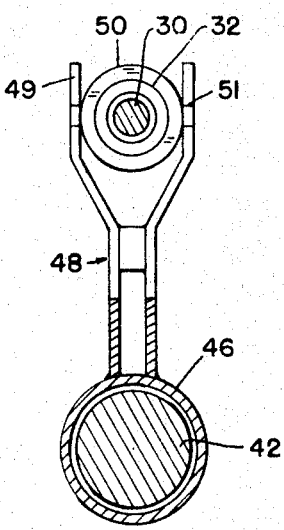
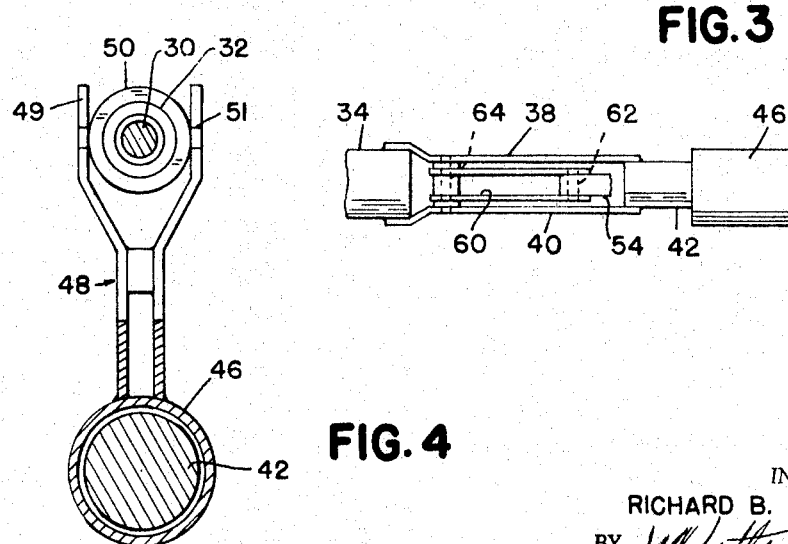
FIG. 4
INVENTOR.
RICHARD B. WALLACE
BY *Whittemore*
*Hulbert & Belknap*
ATTORNEYS 3,263,639
STEERING SYSTEM FOR A BOAT
Richard B. Wallace, Bloomfield Hills, Mich., assignor to The Oakland Corporation, Birmingham, Mich., a corporation of Michigan
Filed Aug. 24, 1964, Ser. No. 391,381
10 Claims. (Cl. 114—144)

The present invention relates to a steering system for a boat, and more particularly, to a steering system including an automatic pilot which may remain connected into the steering system at all times and which may be operated independently of or simultaneously with the usual manually actuated steering device.

It is an object of the present invention to provide a steering system including a manually operated device, a rudder, actuating connections between the device and the rudder including a pair of relatively movable members, an auto-pilot, and means connecting said auto-pilot to both of said members and effective to provide relative movement between said members upon operation of said auto-pilot and to prevent relative movement between said members except when said auto-pilot is operating to correct an error in heading.

It is a further object of the present invention to provide a steering system as described in the preceding paragraph in which the connections between the auto-pilot and said members is a flexible connection which permits operation of the rudder from the manually operated device while said auto-pilot remains connected into the system.

It is a feature of the present invention to provide, in a steering system of the character described, a pair of elongated rigid members one of which is tubular and the other of which is longitudinally slidable in the tubular member comprising in addition an auto-pilot connected to one of said members and including a relatively movable actuator connected to the other of said members.

Other objects and features of the invention will become apparent as the description proceeds, especially when taken in conjunction with the accompanying drawing, illustrating a preferred embodiment of the invention, wherein:

FIGURE 1 is a diagrammatic view illustrating the steering system.

FIGURE 2 is an enlarged elevational view of a portion of the system.

FIGURE 3 is a fragmentary bottom plan view of the apparatus shown in FIGURE 2.

FIGURE 4 is an enlarged section on the line 4—4, FIGURE 2.

The steering system diagrammatically illustrated in FIGURE 1 comprises a rudder 10 pivoted as indicated at 12 for swinging movement about a vertical axis and including an arm 14 by means of which the rudder is moved.

A manually operated device, indicated generally at 16, includes the wheel 18 and an irreversible driving element such as the worm diagrammatically indicated at 20. The worm is connected to suitable cooperating means such for example as a gear or segment (not shown) which in turn is connected to an elongated member 22 which together with aligned elongated member 24 constitutes motion transmitting means connecting the manually operated device 16 to the rudder 10. Connected into the motion transmitting means 22, 24 is auto-pilot mechanism which includes an auto-pilot 26 suitably connected to actuating mechanism indicated diagrammatically at 28 in FIGURE 1 and shown in detail in FIGURES 2-4.

The auto-pilot 26 may be of any suitable type as for example the auto-pilot shown in the prior copending application of Richard B. Wallace and Robert J. Ebbert, Serial No. 211,617, filed July 23, 1962. So far as the present invention is concerned, it is important only to note that the auto-pilot provides means for effecting movement of an actuating element which in the present invention constitutes the flexible but functionally rigid wire 30 of the Bowden wire connection which includes the flexible sheath 32.

Referring now to FIGURE 2, the rigid elongated members 22 and 24 are shown in part. Sleeved over the member 22 is a short tubular member 34 which is welded to the member 22 as indicated at 36. A pair of straps 38 and 40, as best seen in FIGURE 3, are welded at one end to the outside of the tubular member 34 and at their other end are welded to the outer end surfaces of a cylindrical rod 42. The rod 42, as best seen in FIGURE 2, is longitudinally slidable in cylindrical bearings 44 which are mounted in tubular member 46, which in turn is welded or otherwise rigidly secured to the member 24.

Welded to the outside of the tubular member 46 is a bracket 48 having arms 49. One end of the sheath 32 of the Bowden wire extends into a mounting fixture 50 which is pivoted between the arms 49 as indicated at 51. The wire 32 extends outwardly beyond the end of the sheath 32 and is connected to a lever 54 by means of a pivot connection 56, and the portion of the wire 30 connected to the lever 54 is sufficiently rigid to provide push-pull actuation of the lever 54 about a pivot connection to the bracket 48. The pivot connection may be provided by any one of three pairs of holes indicated at 58. The lower end of the lever 54, as seen in FIGURE 2, is connected to a link 60 by pivot connection 62, the link in turn being provided with a pivot connection 64 to the straps 38 and 40.

The auto-pilot when de-energized remains connected to the steering system but is effective at this time to prevent relative movement between the wire 30 and the sheath 32 of the Bowden wire. Accordingly, members 22 and 24 are retained against relative movement and are movable as a unit by the manually operated device. The auto-pilot does not interfere with manual steering because the Bowden wire connection between the auto-pilot and the actuating mechanism 28 is flexible.

Since the manually operated device includes an irreversible worm 20, the wheel 18, and hence the member 22, will remain in fixed position whenever the wheel is released. At this time the auto-pilot when energized takes over steering and effects movement of the member 24 relative to the now normally stationary member 22 through movement imparted to the lever 54. Specifically, when the wire 30 moves to the left as seen in FIGURE 2, it will be apparent that the lever 54 rocks in a counterclockwise direction about pivot 58. The connection of the lever 54 through the link 60 to the member 22 (which is at this time stationary) causes the bracket 48, the tubular member 46, and the elongated member 24 to move to the left as seen in FIGURE 2. Conversely, movement of the wire 30 to the right, as seen in FIGURE 2, results in a corresponding movement of the member 24 to the right, so long as the member 22 remains stationary.

The auto-pilot, which is well understood, senses an error in the heading of the boat and provides a rudder movement to correct the error in heading.

It will be apparent that while the auto-pilot is in control of the steering, it is nevertheless possible for the operator to move the wheel 18 and thus to superimpose on the auto-pilot control of the rudder a movement in accordance with the usual rudder movement resulting from turning of the wheel 18.

Perferably, the auto-pilot mechanism is designed such that the relative motion provided between the members 22 and 24 is small, as for example 1 inch to 1¼ inch, whereas, the motion available from operation of the wheel 18 is much greater, as for example from 7 to 9 inches. This means that the auto-pilot can never overcontrol or nullify the wishes of the man at the wheel.

An important advantage of the present invention is the fact that the wheel, when released, remains in the position at which it was released. Forces applied to the connections to the wheel including the worm 20, are ineffective to produce motion of the wheel. This is to be compared with known auto-pilot mechanisms in which the auto-pilot is in effect connected to the wheel and causes rotation of the wheel during steering by the auto-pilot.

The auto-pilot connected as disclosed herein can be used or kept in operation to assist the man at the wheel long after prior conventional auto-pilots have to be disengaged or shut off. In other words, the auto-pilot connected as disclosed herein can operate in series with the man at the wheel.

The power unit of the auto-pilot need not be capable of producing wide extremes of movement between the members 22 and 24 since the auto-pilot is not sensitive to the center of wind, wave and rudder position. Therefore, a smaller range of control, sufficient only for maintaining a set course, is adequate. The boat can be turned onto the required course with the wheel 18 and even adjusted with a right or left bias to suit the sea or weather conditions, so that the auto-pilot need only correct course deviations by adjusting the rudder right or left from the position into which it has been adjusted prior to turning over full control to the pilot.

The drawing and the foregoing specification constitute a description of the improved steering system for a boat in such full, clear, concise and exact terms as to enable any person skilled in the art to practice the invention, the scope of which is indicated by the appended claims.

What I claim as my invention is:

1. A steering system for a boat comprising a rudder, a self-locking manually operated device, actuating connections between said rudder and said device including an elongated longitudinally movable motion transmitting means, said means including two aligned elongated members relatively movable longitudinally of each other to vary the effective length of said motion transmitting means, one of said members having a tubular end portion in which one end of the other member is slidable and an auto-pilot connected to both of said members and operable to effect relative longitudinal movement therebetween to move said rudder, the connection between the auto-pilot and said members comprising a Bowden wire device having a flexible sheath anchored to one of said members, and a rod extending beyond the end of and slidable relative to said sheath and connected to the other of said members.

2. A system as defined in claim 1 comprising a bracket anchoring said sheath to one of said members, a lever pivoted to said bracket and having one end pivoted to said rod, and a link connected between said lever and said other member.

3. A system as defined in claim 1 in which said auto-pilot and its connection to said members is effective to prevent relative movement between said members except when said auto-pilot is operating to correct an error in heading.

4. A system as defined in claim 1 in which both said manually operated device and said auto-pilot are operable both independently and simultaneously.

5. A steering system for a boat comprising a rudder, a manually operated device, actuating connections between said rudder and said device including a pair of relatively movable members, means connecting one of said members to said device, means connecting the other of said members to said rudder, an auto-pilot, a Bowden wire device connecting said auto-pilot to both of said members and operable to prevent relative movement between said members except when said auto-pilot is operating to correct an error in heading, said device comprising a flexible sheath anchored to one of said members and a rod extending beyond the end of and slidable relative to said sheath and connected to the other of said members.

6. A system as defined in claim 5 in which the manually operated device is self-locking to fix the position of the member to which it is connected except when being manually actuated.

7. A system as defined in claim 5 in which the range of movement of the member connected to said manual operating mechanism imparted thereto by said mechanism is several times greater than the range of movement of the other of said pair of members.

8. A combined manual and automatic control system for a rudder or the like comprising motion transmitting means having a pair of aligned elongated longitudinally movable members, self-locking manually operable means connected to one of said members for moving it longitudinally, automatically operable means including a movable element, a Bowden wire device connecting said automatically operable means to said motion transmitting means, said device having a flexible sheath anchored to one of said members and a rod extending beyond the end of and slidable relative to said sheath and connected to the other of said members.

9. A system as defined in claim 8 comprising a bracket anchoring said sheath to said one member, a lever pivoted to said bracket and having pivotal connection to said rod and said other member.

10. A system as defined in claim 8 in which one of said members has a tubular end portion in which one end of the other of said members is slidably telescoped.

References Cited by the Examiner

UNITED STATES PATENTS

| | | | |
|---|---|---|---|
| 753,576 | 3/1904 | Hoover | 114—155 |
| 1,964,383 | 6/1934 | Goodyear et al. | 74—479 |
| 2,015,183 | 9/1935 | Hodgman | 114—144 |
| 2,112,504 | 3/1938 | Mirfield | 114—144 X |
| 2,499,471 | 3/1950 | Dunning | 114—144 |

FOREIGN PATENTS

| | | |
|---|---|---|
| 786,863 | 11/1957 | Great Britain. |
| 966,367 | 8/1964 | Great Britain. |

MILTON BUCHLER, *Primary Examiner.*

ANDREW H. FARRELL, *Examiner.*